(12) United States Patent
De Gelis

(10) Patent No.: US 8,231,317 B2
(45) Date of Patent: Jul. 31, 2012

(54) FASTENING CLAMP

(75) Inventor: Vincent De Gelis, Seyssinet-Pariset (FR)

(73) Assignee: A. Raymond et Cie, Grenoble (FR)

( * ) Notice: Subject to any disclaimer, the term of this patent is extended or adjusted under 35 U.S.C. 154(b) by 596 days.

(21) Appl. No.: 11/992,364

(22) PCT Filed: Jul. 14, 2006

(86) PCT No.: PCT/EP2006/006887
§ 371 (c)(1),
(2), (4) Date: Sep. 15, 2009

(87) PCT Pub. No.: WO2007/036253
PCT Pub. Date: Apr. 5, 2007

(65) Prior Publication Data
US 2010/0000058 A1    Jan. 7, 2010

(30) Foreign Application Priority Data
Sep. 23, 2005   (DE) .................. 10 2005 045 723

(51) Int. Cl.
*F16B 37/04* (2006.01)
(52) U.S. Cl. ........ 411/174; 411/187; 411/188; 411/970; 411/999
(58) Field of Classification Search ............... 411/149, 411/172, 174, 175–179, 187–188, 533, 970, 411/999; 24/514, 174, 293–295, 458; 470/41–42
See application file for complete search history.

(56) References Cited

U.S. PATENT DOCUMENTS
2,716,434 A * 8/1955 Crowther ................. 411/106
(Continued)

FOREIGN PATENT DOCUMENTS
DE       4228511 A1    3/1994
(Continued)

OTHER PUBLICATIONS

U.S. Patent Appln. Publication 2005/0144763 A1, published Jul. 7, 2005.

*Primary Examiner* — Vistor Batson
*Assistant Examiner* — Roberta Delisle
(74) *Attorney, Agent, or Firm* — Tarolli, Sundheim, Covell & Tummino LLP

(57) ABSTRACT

A fastening clamp for connecting a carrier part (13) and an add-on part (14) has a plug-through leg (1), with a plug-through sleeve (5), and a threaded leg (2), which is connected to a thread unit (10). The plug-through sleeve (5) extends away from the threaded leg (2) and has an effective overall height which is greater than the thickness of an add-on part (14). Engagement elements (11) are present on that side of the thread leg (2) which is directed towards the plug-through leg (1). In a pre-assembly arrangement, the legs (1, 2) are spaced apart by a distance which is large enough to allow a carrier part (13) to be positioned between the legs (1, 2) such that it is essentially free of engagement with the engagement elements (11), in which case, once a screw has been screwed into an end position, the engagement elements (11) thus engage with the carrier part (13) such that the fastening clamp is connected in a non-displaceable manner to the carrier part (13). This achieves a certain degree of positioning freedom on the carrier part (13) and, for tolerance-compensating purposes, movement of the add-on part (14).

20 Claims, 4 Drawing Sheets

U.S. PATENT DOCUMENTS

| | | | |
|---|---|---|---|
| 3,340,494 A * | 9/1967 | Gutshall | 439/434 |
| 3,426,818 A * | 2/1969 | Derby | 411/175 |
| 3,810,069 A * | 5/1974 | Jaconette, Jr. | 439/97 |
| 4,074,491 A * | 2/1978 | Bell et al. | 52/394 |
| 4,333,211 A * | 6/1982 | Gunther | 411/554 |
| 4,684,305 A * | 8/1987 | Dubost | 411/174 |
| 5,039,264 A * | 8/1991 | Benn | 411/175 |
| 5,339,500 A | 8/1994 | Muller et al. | |
| 5,423,646 A * | 6/1995 | Gagnon | 411/184 |
| 5,893,694 A * | 4/1999 | Wilusz et al. | 411/112 |
| 6,131,252 A * | 10/2000 | Hoheisel et al. | 24/514 |
| 6,287,064 B1 * | 9/2001 | Jhumra et al. | 411/175 |

FOREIGN PATENT DOCUMENTS

| | | |
|---|---|---|
| DE | 10153569 A1 | 5/2003 |
| FR | 2762882 A1 | 11/1998 |

\* cited by examiner

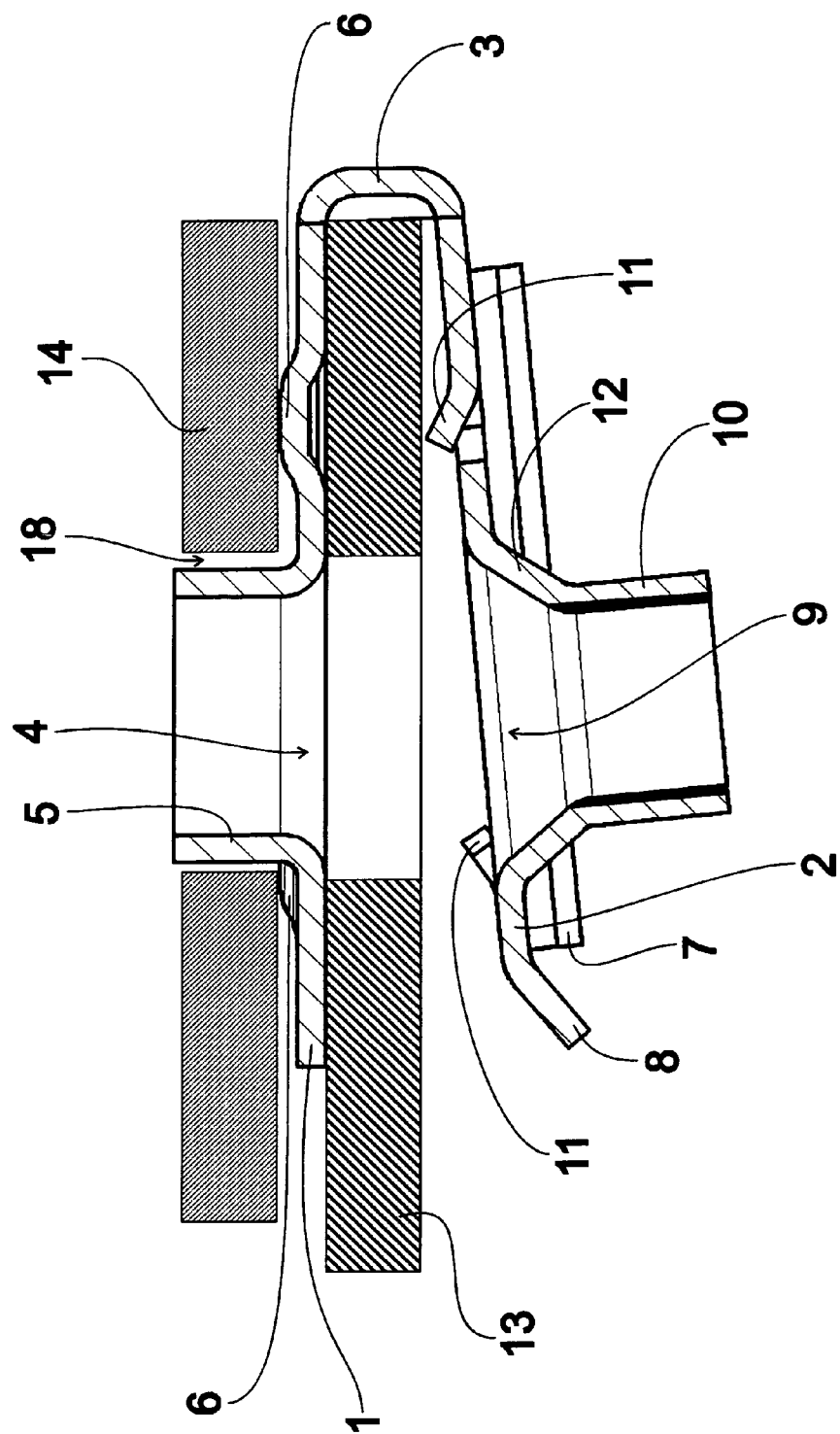

FASTENING CLAMP

TECHNICAL FIELD

The invention concerns a fastening clamp for connecting a carrier part and an add-on part.

BACKGROUND ART

A fastening clamp such as this is known from FR 2 762 882 A1. The already known fastening clamp for connecting a carrier part and an add-on part via a pass-through leg having a pass-through sleeve, through which a screw can be guided, and a threaded leg arranged opposite to the pass-through leg, which is connected via a film hinge to a fitting plate opposite to the pass-through leg, which supports a spacer sleeve that extends in the direction of the pass-through leg. A threaded unit, which is aligned facing away from the pass-through leg and into which a screw can be screwed, is formed on the threaded leg. The pass-through sleeve extends away from the threaded leg and has an effective overall height that is greater than the thickness of an add-on part. Engagement elements are also configured, and the pass-through leg as well as the threaded leg have a distance in a relatively widely spread arrangement of the fastening clamp prior to accomplishing the connection, which is so great that a carrier part can be positioned essentially free of engagement with the engagement elements between the pass-through leg and the threaded leg, so that the engagement elements engage in such a way with the carrier part in an end position after a screw is screwed in that the fastening clamp is non-displaceably connected to the carrier part.

From DE 42 28 511 A1 is known a fastening clamp that serves for connecting a carrier part as well as an add-on part and has a pass-through leg, which has a pass-through sleeve. A screw can be guided through the pass-through sleeve. In addition, a threaded leg is also provided, which is arranged opposite to the pass-through leg and is connected to a threaded unit. The screw can be screwed into the threaded unit. In the previously known fastening clamp, a pass-through sleeve is also configured on the threaded leg, while the pass-through sleeves extend toward each other from the mutually facing sides of the pass-through leg or the threaded leg. Herein, the overall height of the pass-through sleeves is greater than the thickness of the carrier part on which the fastening clamp is to be mounted. On the pass-through leg and on the threaded leg are configured spring tabs, which are braced on the corresponding side of the carrier part when the fastening clamp is positioned correctly on the carrier part. In this way, the screw can be tightened sufficiently strongly to make available a secure locking and on the other hand, the expansion characteristics are not affected by the screw connection. There is, however, no possibility for adjustment in this previously known fastening clamp.

From DE 101 53 569 A1 is known a fastening clamp for connecting plates with different expansion characteristics, which has a threaded sleeve formed on a rectangular base plate This fastening clamp can be clamped in a elongated hole of a carrier part and can be displaced in its longitudinal direction, wherein the threaded sleeve engages through the elongated hole. An add-on part can be connected in such a way to the carrier part that it is fastened on the side of the base plate that is opposite to the side of the threaded sleeve and is mounted with a screw that engages with the threaded sleeve. Consequently, the add-on part can be displaced in the longitudinal direction of the elongated hole. However, the position of the fastening clamp is fixed in a direction that is transversal to the longitudinal direction of the elongated hole.

DISCLOSURE OF THE INVENTION

It is an object of the invention to disclose a fastening clamp of the kind described above, which is characterized by a low overall height already when it is mounted on the carrier part.

This object is attained according to the invention with a fastening clamp of the kind mentioned above, which has the characteristic features of patent claim 1.

Because a barrier-free penetration of the carrier part is created in the fastening clamp according to the invention as a result of the direct connection of the pass-through leg and the threaded leg via the connecting section between the pass-through leg and the threaded leg, the pass-through leg and the threaded leg must only be slightly separated from each other, namely at least by the equivalent of the effective thickness of the engagement elements, in order to make possible an essentially engagement-free positioning of the carrier part in the fastening clamp.

Further practical embodiments of the invention are the object of the dependent claims.

From the following description of a preferred exemplary embodiment of the invention with reference to the figures of the drawing can be deduced further practical configurations and advantages. In the drawings:

BRIEF DESCRIPTION OF THE DRAWINGS

FIG. 4 shows a section in longitudinal direction through the exemplary embodiment of FIG. 1 with a carrier part inserted into the fastening clamp and with an add-on component placed on the fastening clamp.

BEST MODE FOR CARRYING OUT THE INVENTION

Figure 1:
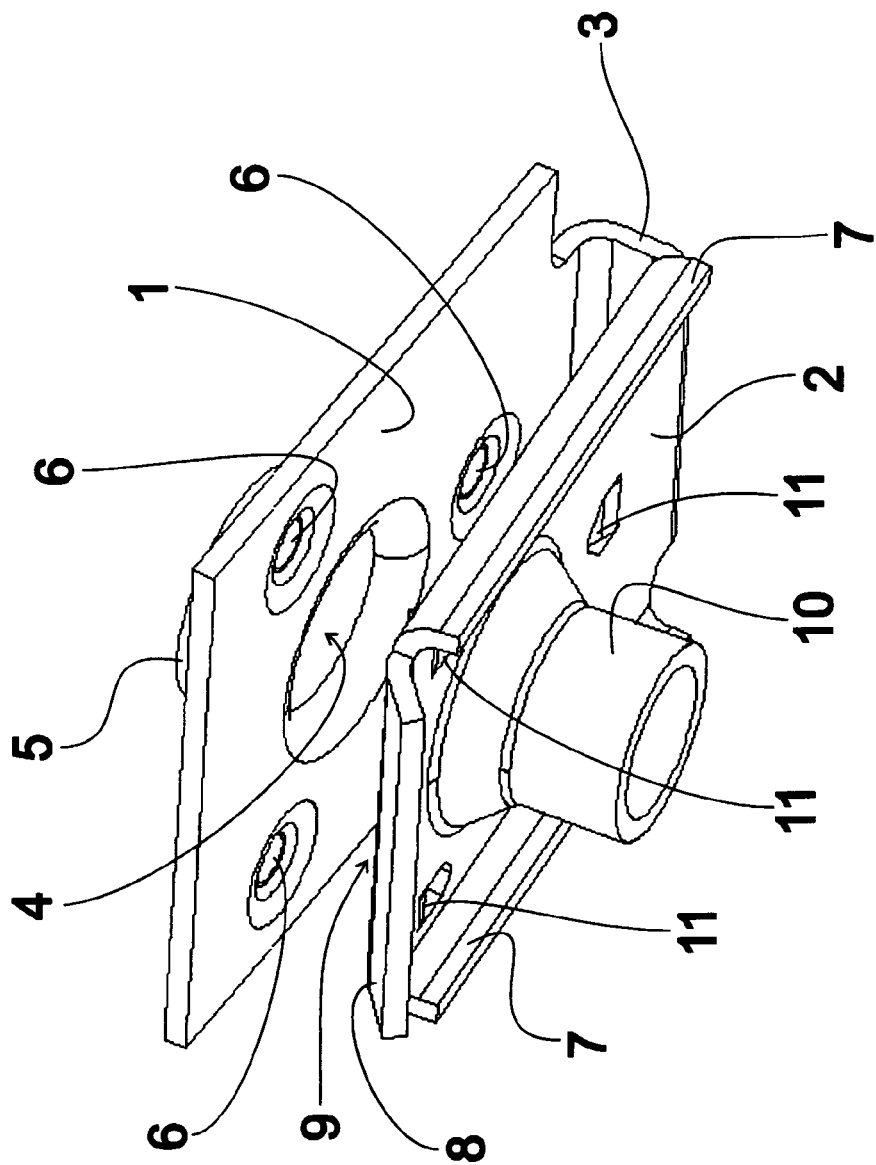
FIG. 1 shows a perspective view of an exemplary embodiment of a fastening clamp according to the invention.

FIG. 1 shows a perspective view of an exemplary embodiment of a fastening clamp according to the invention, which has an essentially rectangular, flat pass-through leg 1 and a likewise rectangular threaded leg 2 arranged opposite to the pass-through leg. The pass-through leg 1 and the threaded leg 2 are mutually connected via a connecting section 3 positioned on the narrow side edges.

The pass-through leg 1 has a pass-through recess 4, on whose edge area is positioned a pass-through sleeve 5, which extends away from the pass-through leg 1. A multitude of elevations 6, which project over the side of the pass-through leg 1 that faces away from the threaded leg 2, are embossed in the pass-through leg 1 around the pass-through sleeve 5.

The threaded leg 2 has lateral ribs 7 as reinforcement at its longer side edges, which are bent essentially at a right angle and face away from the pass-through leg 1. On the short side edge, the threaded leg 2 is configured with a diagonally bent insertion tongue 8, which faces away from the pass-through leg 1.

The threaded leg 2 lying opposite to the pass-through recess 4 has a guide-through recess 9, which is not shown in the representation according to FIG. 1, along whose edge area is positioned a threaded sleeve 10 as threaded unit with an inner thread formed therein, which faces away from the pass-through leg 1. Claw-shaped tongues 11, which face in the direction of the pass-through leg 1, are punched around the threaded sleeve 10 as engagement elements.

Figure 2:
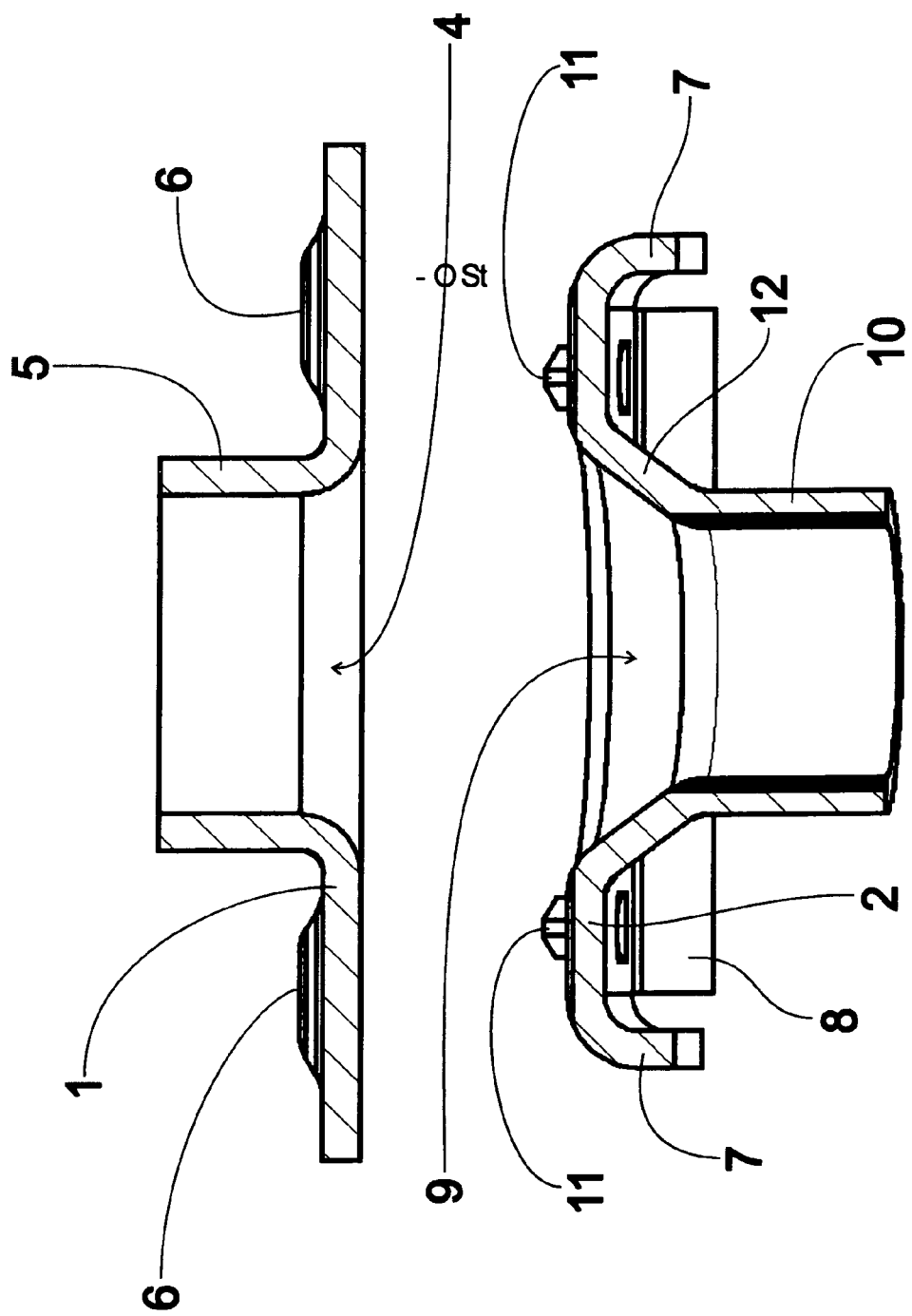
FIG. 2 shows a section in transversal direction through the fastening clamp of FIG. 1.

FIG. 2 shows the fastening clamp depicted in FIG. 1 in a section parallel to the shorter side edges of the pass-through leg 1 or the threaded leg 2 in the area of the pass-through sleeve 5 or the threaded sleeve 10 in a direction facing away from the connecting section 3. In FIG. 2, it can be seen that the inner diameter of the pass-through sleeve 5 is greater than the inner diameter of the threaded sleeve 10 and that the threaded sleeve 10 is connected to the threaded leg 2 via a conical section 12, which becomes greater from the threaded sleeve 10 to the threaded leg 2. In this way, it is relatively easy to guide a screw, which is not shown in FIG. 2, through the pass-through sleeve 5 into the threaded sleeve 10, while the conical section 12 also leads to an advantageous application of force when the screw is tightened in order to prevent deformations.

In addition, as can be seen in FIG. 2, the elevations 6 project slightly above the side of the pass-through leg 1 that faces away from the threaded leg 2 with respect to the overall height of the pass-through sleeve 5 and, in this way, an effective overall height of the pass-through sleeve 5, which will be described in more detail below, is reduced only to a limited extent.

Figure 3:
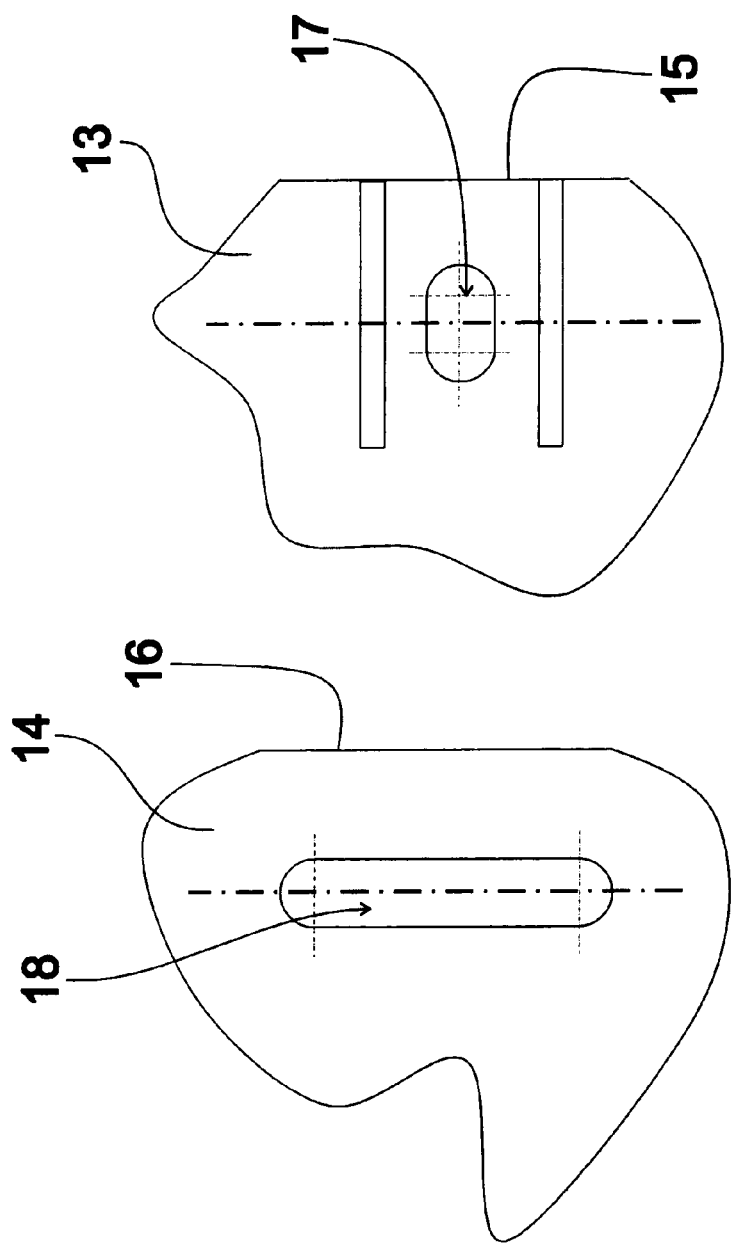
FIG. 3 shows plan views of a carrier part and an add-on part, which are to be connected with a fastening clamp according to the invention.

FIG. 3 shows a carrier part 13 and an add-on part 14, which are to be connected with the fastening clamp according to the invention, which was described above, wherein FIG. 3 merely depicts the areas that are relevant for the implementation of the connection. Herein, the carrier part 13 and also the add-on part 14 have each one straight peripheral edge 15, 16, which should be flush with respect to each other after the connection of the carrier part 13 and the add-on part 14. For this purpose, the carrier part 13 is configured with an elongated carrier part recess 17, whose longitudinal direction is aligned at a right angle with respect to the peripheral edge 15 of the carrier part 13 and which has a width that is greater than the outer diameter of the threaded sleeve 10. The carrier part recess 17 ends at a distance from the peripheral edge 15 of the carrier part 13.

The add-on part 14 has an elongated add-on part recess 18, whose longitudinal axis is aligned parallel to the peripheral edge 16 of the add-on part 14. The longitudinal axis of the add-on part recess 18 is located in the center of the carrier part recess 17 when the peripheral edges 15, 16 are approximately aligned.

FIG. 4 shows the previously described fastening clamp according to the invention with a carrier part 13 inserted between the pass-through leg 1 and the threaded leg 2 as well as an add-on part 14 applied on the elevations 6 prior to inserting a screw through the pass-through sleeve 5 to be screwed into the threaded sleeve 10. In FIG. 4, it can be seen that a sufficiently large distance is created in this way by means of a bent V-shaped positioning of the pass-through leg 1 and the threaded leg 2, which allows the fastening clamp to be mounted without impediment on the carrier part 13 without engaging the claw tongues 11. In the arrangement according to FIG. 4, the fastening clamp can be finely adjusted with respect to the carrier part 13 in order to assume an end position after the screw engages with the threaded sleeve 10 already prior to a fixing engagement of the claw tongues 11 with the carrier part 13, whereupon the fastening clamp is fixed in the end position after the screw is tightened and the claw tongues 11 have completely engaged with the carrier part 13.

After accomplishing the fixed screw connection, the head of the screw or a washer placed between the head of the screw and its threaded section rests on the edge of the threaded sleeve 5 that faces away from the threaded leg 2. By aligning the effective overall height of the threaded sleeve 5 fixed by the distance between the edge of the threaded sleeve 5 facing away from the threaded leg 2 and the contact plane with the elevations 6 or, if the latter is missing, from the side of the pass-through leg 1 facing away from the threaded leg 2 in such a way that it is greater than the thickness of the add-on part 14, the add-on part 14 can be moved to compensate for tolerances in the longitudinal direction of the add-on part recess 18, on the one hand, and also to a limited extent between the side of the screw facing toward the pass-through leg 1 or the washer and the upper side of the elevations 6. A relatively low friction is achieved between the fastening clamp and the add-on piece 1 by means of the relatively small surface of contact of the add-on part 14 with the elevations 6.

Although the foregoing has been described in conjunction with a preferred embodiment, it is to be appreciated that various modifications may be made without departing from the spirit and scope of the invention as defined by the appended claims.

The invention claimed is:

1. A fastening clamp for connecting a carrier part (13) and an add-on part (14) to a pass-through leg (1) having a pass-through sleeve (5), through which a screw can be guided and a threaded leg (2) arranged opposite to the pass-through leg (1), which is connected to a threaded sleeve (10) aligned facing away from the pass-through leg (1), into which the screw can be screwed, in which the pass-through sleeve (5) extends away from the threaded leg (2) and has an effective overall height that is greater than the thickness of the add-on part (14), in which engagement elements (11) are provided, and the pass-through leg (1) as well as the threaded leg (2) have a distance prior to accomplishing the connection in one arrangement of the fastening clamp that is so great that a carrier part (13) can be positioned essentially free of engagement with the engagement elements (11) between the pass-through leg (1) and the threaded leg (2), so that the engagement elements (11) engage in such a way with the carrier part (13) after a screw is screwed in an end position that the fastening clamp is connected to the carrier part (13) in a non-displaceable manner, wherein the pass-through leg (1) and the threaded leg (2) are mutually connected to each other via a connecting section (3) positioned on the side edges of the pass-through leg (1) and the threaded leg (2).

2. The fastening clamp of claim 1, wherein the engagement elements are configured as punched claw tongues (11).

3. The fastening clamp of claim 1, wherein elevations (6) are configured on the pass-through leg (1), which extend over the side of the pass-through leg (1) facing away from the threaded leg (2).

4. The fastening clamp of claim 1, wherein the engagement elements (11) have lateral ribs (7), which are configured on the side of the threaded leg (2) facing toward the pass-through leg (1) and on the opposite side edges of the threaded leg (2) and are directed away from the pass-through leg (1).

5. The fastening clamp of claim 1, wherein the threaded sleeve (10) is connected to the threaded leg (2) via a conical section (12).

6. The fastening clamp of claim 2, wherein elevations (6) are configured on the pass-through leg (1), which extend over the side of the pass-through leg (1) facing away from the threaded leg (2).

7. The fastening clamp of claim 2, wherein the engagement elements (11) have lateral ribs (7), which are configured on the side of the threaded leg (2) facing toward the pass-through leg (1) and on the opposite side edges of the threaded leg (2) and are directed away from the pass-through leg (1).

8. The fastening clamp of claim 3, wherein the engagement elements (11) have lateral ribs (7), which are configured on the side of the threaded leg (2) facing toward the pass-through leg (1) and on the opposite side edges of the threaded leg (2) and are directed away from the pass-through leg (1).

9. The fastening clamp of claim 2, wherein the threaded sleeve (10) is connected to the threaded leg (2) via a conical section (12).

10. The fastening clamp of claim 3, wherein the threaded sleeve (10) is connected to the threaded leg (2) via a conical section (12).

11. The fastening clamp of claim 4, wherein the threaded sleeve (10) is connected to the threaded leg (2) via a conical section (12).

12. The fastening clamp of claim 6, wherein the engagement elements (11) have lateral ribs (7), which are configured on the side of the threaded leg (2) facing toward the pass-through leg (1) and on the opposite side edges of the threaded leg (2) and are directed away from the pass-through leg (1).

13. The fastening clamp of claim 6, wherein the threaded sleeve (10) is connected to the threaded leg (2) via a conical section (12).

14. The fastening clamp of claim 7, wherein the threaded sleeve (10) is connected to the threaded leg (2) via a conical section (12).

15. The fastening clamp of claim 8, wherein the threaded sleeve (10) is connected to the threaded leg (2) via a conical section (12).

16. The fastening clamp of claim 2, wherein the threaded sleeve (10) is connected to the threaded leg (2) via a conical section (12).

17. The fastening clamp of claim 3, wherein the threaded sleeve (10) is connected to the threaded leg (2) via a conical section (12).

18. The fastening clamp of claim 4, wherein the threaded sleeve (10) is connected to the threaded leg (2) via a conical section (12).

19. The fastening clamp of claim 1, wherein the threaded sleeve (10) extends away from the threaded leg (2) in a direction that is opposite to the direction the sleeve (5) extends away from the pass-through leg (1).

20. A fastening clip for connecting a carrier part and an add-on part comprising:
   a pass-through leg having a pass-through sleeve through which a screw can be guided; and
   a threaded leg having engagement elements and a threaded sleeve into which the screw can be threaded, the pass-through sleeve extending away from the pass-through leg in a direction that is opposite to the direction that the threaded sleeve extends away from the threaded leg;
   the pass-through leg and the threaded leg having a first condition for allowing the carrier part to be positioned therebetween without engaging the engagement elements, the screw being screwed into the threaded sleeve to place the pass-through leg and the threaded leg in a second condition in which the engagement elements engage the carrier part to prevent relative movement between the fastening clip and the carrier part.

* * * * *